US011968973B2

(12) United States Patent
Seitz et al.

(10) Patent No.: US 11,968,973 B2
(45) Date of Patent: Apr. 30, 2024

(54) METHOD FOR APPLYING A SPRAY TO A FIELD BASED ON ANALYSIS OF EVALUATION PORTION OF MONITORED FIELD SECTION

(71) Applicant: Robert Bosch GmbH, Stuttgart (DE)

(72) Inventors: Peter Seitz, Renningen (DE); Nicolas Houis, Bietigheim-Bissingen (DE); Tillmann Falck, Bochum (DE)

(73) Assignee: ROBERT BOSCH GMBH, Stuttgart (DE)

( * ) Notice: Subject to any disclaimer, the term of this patent is extended or adjusted under 35 U.S.C. 154(b) by 607 days.

(21) Appl. No.: 17/285,009

(22) PCT Filed: Sep. 27, 2019

(86) PCT No.: PCT/EP2019/076173
§ 371 (c)(1),
(2) Date: Apr. 13, 2021

(87) PCT Pub. No.: WO2020/078692
PCT Pub. Date: Apr. 23, 2020

(65) Prior Publication Data
US 2021/0386051 A1 Dec. 16, 2021

(30) Foreign Application Priority Data
Oct. 17, 2018 (DE) .......................... 102018217742.2

(51) Int. Cl.
*A01M 7/00* (2006.01)
*A01M 21/04* (2006.01)
*G05B 15/02* (2006.01)

(52) U.S. Cl.
CPC ........ *A01M 7/0089* (2013.01); *A01M 21/043* (2013.01); *G05B 15/02* (2013.01)

(58) Field of Classification Search
None
See application file for complete search history.

(56) References Cited

U.S. PATENT DOCUMENTS

| 2014/0001276 | A1* | 1/2014 | Joergensen | A01M 21/043 239/69 |
| 2015/0027044 | A1* | 1/2015 | Redden | A01G 7/06 47/58.1 R |

(Continued)

FOREIGN PATENT DOCUMENTS

| CN | 1945601 A | 4/2007 |
| CN | 105993504 A | 10/2016 |

(Continued)

OTHER PUBLICATIONS

International Search Report for PCT/EP2019/076173, dated Dec. 12, 2019.

*Primary Examiner* — Bernard G Lindsay
(74) *Attorney, Agent, or Firm* — NORTON ROSE FULBRIGHT US LLP; Gerard A. Messina

(57) ABSTRACT

A method for applying a spray to a field using an agricultural spraying device. The method includes: monitoring a field section of the field having plants, using an optical and/or infrared detection unit; identifying at least one row of plants in the monitored field section using a processing unit; using the processing unit, defining a plant region including the at least one identified row of plants in a specified evaluation portion of the monitored field section, using the at least one identified row of plants and a weed region different from the plant region; ascertaining a plant value of the weed region in the specified evaluation portion of the monitored field section using the processing unit; and applying the spray to the weed region of the specified evaluation portion as a function of the ascertained plant value, using spray nozzles of the agricultural spraying device.

11 Claims, 3 Drawing Sheets

(56) References Cited

U.S. PATENT DOCUMENTS

| | | | |
|---|---|---|---|
| 2015/0245565 A1* | 9/2015 | Pilgrim | H01L 27/14621 |
| | | | 239/71 |
| 2018/0024050 A1* | 1/2018 | Hollstein | G01N 33/0098 |
| | | | 382/103 |
| 2018/0168141 A1 | 6/2018 | Tanner et al. | |
| 2019/0104722 A1* | 4/2019 | Slaughter | A01M 7/0089 |
| 2019/0150357 A1* | 5/2019 | Wu | H04N 7/188 |
| 2020/0045953 A1* | 2/2020 | Serrat | A01M 7/0042 |
| 2021/0158041 A1* | 5/2021 | Chowdhary | G05D 1/0278 |

FOREIGN PATENT DOCUMENTS

| | | |
|---|---|---|
| CN | 108549869 A | 9/2018 |
| DE | 102017210804 A1 | 12/2018 |
| EP | 3357332 A1 | 8/2018 |
| EP | 3482633 A1 | 5/2019 |
| WO | 2017181127 A1 | 10/2017 |

\* cited by examiner

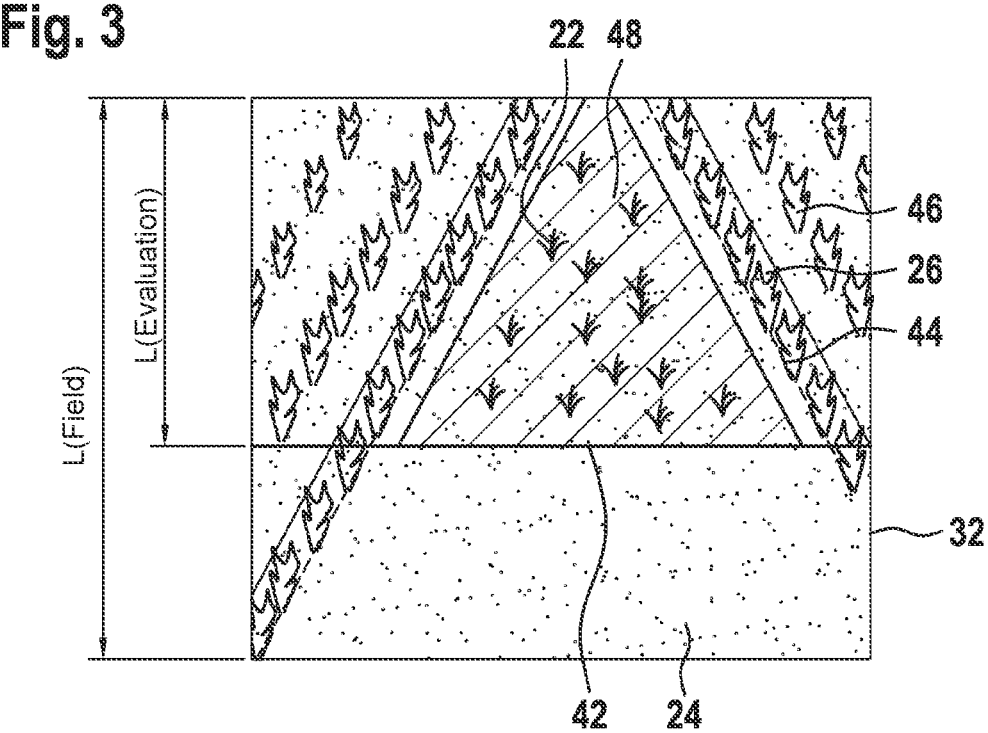
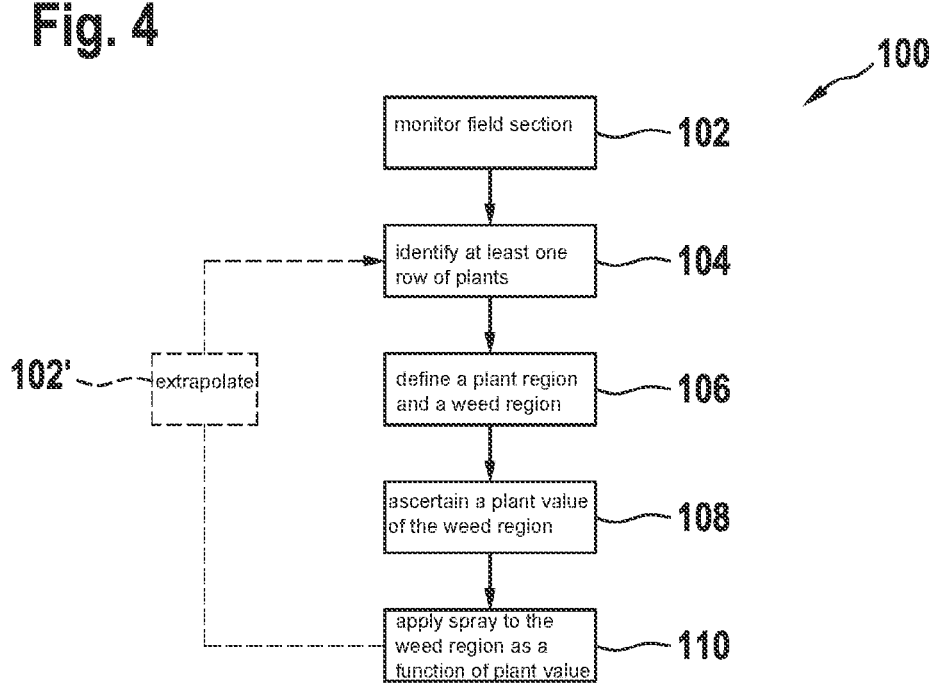

METHOD FOR APPLYING A SPRAY TO A FIELD BASED ON ANALYSIS OF EVALUATION PORTION OF MONITORED FIELD SECTION

FIELD

The present invention relates to a method for applying a spray, in particular, a crop protection chemical, to a field with the aid of an agricultural spraying device, as well as to an agricultural spraying device. The present invention also includes a control unit and a computer program.

BACKGROUND INFORMATION

Algorithms for detecting rows of plants are available. In most cases, the basis for them are camera shots, which have been taken from a field machine. These shots are taken at sharp angles of inclination and show an image portion that is as large as possible, in order to simplify the detection of plant rows as much as possible.

In addition, methods for detecting and classifying weeds are available, which are executed, using small, high-resolution images, and preferably at no angle of inclination, in order to obtain sufficient image resolution for detecting small plant objects.

Together with the traveling speed, the geometric distance between the monitored field section and the spray region on the field yields the maximum reaction time of a system. If more time is necessary for image recording, image processing, internal communication times, nozzle and/or valve control, and flight time of the spray, then the system is not able to carry out locationally correct application. Important parameters for increasing the geometric distance include, above all, the geometric distance between the camera and the nozzle, the angle of inclination of the camera, and the length of the monitored field section, that is, of the acquired image portion at the base of the field.

In this connection, there is a conflict of aims between the detection of the rows of plants, the quality of which increases with the length of the image portion in the direction of travel, and the detection of weeds, in which images that are high-resolution and as small as possible are required, in order to obtain sufficient ground resolution and minimize the processing time, which means that ultimately, the operating speed is limited.

German Patent Application No. DE 10 2017 210 804 describes a method for applying a crop protection chemical, in which rows of plants in a monitored field section are identified, plant regions and weed regions are defined in the monitored field section, a plant value of the weed region of the monitored field section is ascertained, and the crop protection chemical is applied to the weed region as a function of this.

SUMMARY

The present invention includes a method for applying a spray, in particular, a crop protection chemical, to a field with the aid of an agricultural spraying device. In accordance with an example embodiment of the present invention, the method includes:
monitoring a field section of the field having plants, with the aid of an optical and/or infrared detection unit;
identifying at least one row of plants in the monitored field section with the aid of a processing unit;
with the aid of the processing unit, defining a plant region containing the at least one identified row of plants, in a specified evaluation portion of the monitored field section, using the at least one identified row of plants and a weed region different from the plant region;
ascertaining a plant value of the weed region in the specified evaluation portion of the monitored field section with the aid of the processing unit; and
applying the spray to the weed region of the specified evaluation portion as a function of the ascertained plant value, using spray nozzles of the agricultural spraying device.

The present invention also includes a control unit having a processing unit. In accordance with an example embodiment of the present invention, the control unit is configured to execute and/or control the steps of the example method described above, in particular, the following steps:
identifying at least one row of plants in a field section of a field having plants; the field section being monitored with the aid of an optical and/or infrared detection unit;
defining a plant region including the at least one identified row of plants in a specified evaluation portion of the monitored field section, using the at least one identified row of plants and a weed region different from the plant region;
ascertaining a plant value of the weed region in the specified evaluation portion of the monitored field section; and
outputting a control signal in such a manner, that a spray is applied to the weed region of the specified evaluation portion as a function of the ascertained plant value, using spray nozzles of an agricultural spraying device.

The present invention also includes an agricultural spraying device. In accordance with an example embodiment of the present invention, the device includes:
an optical and/or infrared detection unit for monitoring a field section of the field having plants; an optical axis of the optical and/or infrared detection unit having an angle of inclination greater than 0° relative to the vertical, in the direction of travel of the spraying device;
a control unit described above; and
spray nozzles for applying a spray to the weed region of the specified evaluation portion as a function of the ascertained plant value.

The present invention also includes a computer program, which is configured to execute and/or control the steps of the example method(s) described above, as well as a machine-readable storage medium, in which the computer program is stored.

The spray is, in particular, a spray liquid. The spray may include or be an agricultural preparation and/or crop protection chemical, in particular, a crop protection chemical concentrate. Accordingly, the spray may include, e.g., an herbicide, fungicide, or an insecticide (pesticide). However, the spray may also include or be a fertilizer, in particular, a fertilizer concentrate. Therefore, the spray may include a growth regulator. The spray may include a granular active agent, which is mixed with a carrier liquid.

In this case, a field may be understood as land used agriculturally, land for cultivating plants, or also a parcel of such land or cultivating land. Thus, the field may be an area of arable land, a grassland, or a meadow. The plants may be, for example, useful plants, whose fruit may be utilized agriculturally, for example, as a foodstuff, animal feed, or energy crop.

The monitored field section may be a monitoring portion and/or a monitored image portion, in particular, the entire monitored image portion of an optical and/or infrared detection unit. The monitored field section is preferably a cohesive field section. For example, a camera or a 3-d camera may be understood as an optical detection unit. The optical and/or infrared detection unit may be calibrated, in order to calculate, e.g., the height classification from acquired images. The optical and/or infrared detection unit may be positioned on a mobile unit; the mobile unit being able to take the form of, in particular, a land vehicle and/or aircraft and/or trailer. The mobile unit may be, in particular, an agricultural processing machine, such as a towing vehicle, a tractor, a self-driving and/or autonomous field sprayer or a self-driving and/or autonomous robot.

The step of monitoring the field section may take place, for example, while a mobile unit, which includes the optical and/or infrared detection unit, travels over the field. In this connection, the plants in the field section and/or monitored image portion may be detected simultaneously with the aid of the optical and/or infrared detection unit.

The step of identifying and/or detecting the at least one row of plants may be carried out continuously and/or continually, that is, for each step of the defining of the plant region and the weed region, and of the ascertaining of the plant value.

The step of identifying the at least one row of plants is preferably accomplished, using and/or evaluating the entire and/or essentially the entire, monitored field section, that is, in the image having the maximum possible length L(Field), which is determined by the mounting position of the detection unit or camera and the imager chip used.

In this connection, the plants are initially detected. Detection of plants may be understood, for example, as the determination of the presence of plants in the field section, in particular, without classifying the plants in the process. The step of detecting plants may include measuring a color portion and/or chromaticity value, in particular, a portion of the color green and/or a portion of the color red and/or an infrared portion in the monitored field section and/or image portion. In this connection, with the aid of the optical and/or infrared detection unit, for example, in light of a predetermined NDVI value (normalized differenced vegetation index; it is calculated from reflectance values in the near infrared and visible red wavelength ranges of the light spectrum), plants may be detected by distinguishing biomass from the ground (earth). The row of plants may advantageously be identified, using at least one of the following information items: color portion, in particular, portion of the color green of the detected plants, infrared portion of the detected plants, plant spacing, spacing of plant rows, stage of growth of the plants, geographic coordinates of the seed of the plants. With the aid of these information items and/or characteristics, the rows of plants may be identified in a simple and reliable manner. Since rows of plants extend substantially in a straight line, a row of plants may also be identified, e.g., by fitting a straight line and/or a straight center line of the plant rows to an image trajectory having the highest portion of the color green and/or green value. In the identifying step, all of the rows of plants are preferably identified in the monitored field section.

The specified or defined evaluation portion is a specified or defined subsection of the monitored field section, that is, inside of the monitored field section. The specified evaluation portion and the monitored field section preferably have the same width in the direction of travel of the spraying device. However, in the direction of travel of the spraying device, the specified evaluation portion has a length L(Evaluation) less than the length L(Field) of the monitored field section. Length L(Evaluation) of the specified and/or defined evaluation portion is preferably constant. The position of the specified and/or defined evaluation portion inside of the monitored field section may be constant (during the execution of the method). However, the position of the specified and/or defined evaluation portion inside of the monitored field section may also vary (during the execution of the method). Length L(Evaluation) of the specified evaluation portion may be set either inside downstream image processing software of the processing unit or, if supported by the optical detection unit and/or camera, directly as an ROI (region of interest) definition on the level of the imager chip of the optical detection unit and/or camera.

In accordance with an example embodiment of the present invention, in contrast to the step of identifying the at least one row of plants, which is carried out in the (entire) monitored field section, the steps of defining a plant region and a weed region different from the plant region, and of ascertaining a plant value of the weed region, are carried out in the specified evaluation portion, that is, only in a subsection of the monitored field section. That is, in other words, the step of defining a plant region and a weed region different from the plant region and the step of ascertaining a plant value of the weed region are only, that is, exclusively, carried out in the specified evaluation portion of the monitored field section.

In accordance with an example embodiment of the present invention, the step of defining the plant region is accomplished, using the at least one identified row of plants and/or the corresponding position of the row of plants. In this connection, the use of the at least one identified row of plants and/or the corresponding position of the row of plants includes both the direct and indirect use of the corresponding data and/or information items. In other words, this means that the use of the at least one identified row of plants also includes a modification, e.g., extrapolation, of the corresponding data and/or information items, without, in so doing, departing from the scope of the present invention.

The plant region and the weed region extend completely within the specified evaluation portion. The plant region may completely encompass the plants of the row of plants in the specified evaluation portion. However, the plant region may also include the row of plants, without the individual plants of the row of plants being completely included. Therefore, the plant region may also only partially include the individual plants of the row of plants. The plant region may be defined about the respective center line of the row of plants, e.g., to have a constant, i.e., fixed, or a variable width. However, the plant region may also be the center line of the row of plants itself. The weed region preferably extends between the rows of plants in the specified evaluation portion. The weed region may be a residual region of the specified evaluation portion, which results according to the definition of the plant region in the specified evaluation portion.

The plant value may represent or be a degree of coverage of the weed region by plant material in the specified evaluation portion and/or an amount of plant material in the weed region and/or a number of weeds in the weed region. The degree of coverage is defined by the ratio of land covered by plant material to the total land. Accordingly, the degree of coverage is the ratio of the covered area in the weed region to the entire weed region. The number of pixels in the acquired image, in which plant material is detected, may be determined for that. Thus, with the aid of the plant value, a coefficient of measure of the infestation may be derived, as a function of which it is decided if, and possibly how, that is, with what application amount, the weed region is treated.

In accordance with an example embodiment of the present invention, the step of applying is carried out as a function of a magnitude of the ascertained plant value. The step of applying may include comparing the ascertained plant value to a threshold value; the step of applying being executed in response to the threshold value's being reached, fallen below, or exceeded. The threshold value may be inputted manually. In this connection, a so-called spraying rule, that is, a relationship between a determined plant value and the decision as to whether, and how much of, a crop protection chemical should be applied, may be stored as a function of the cultivation in the field, the stage of growth, and/or the crop protection chemical utilized. For example, the rule could read, "If the degree of coverage in the weed region>5%, then an application is carried out." In the application step, the spray is advantageously applied substantially uniformly to the weed region. In the scope of the present invention, uniform application may be understood as application with a predefined application amount per unit area. A predefined application amount may be understood as an application amount set in advance and/or at the start of the treatment. In this connection, the predefined application amount is a substantially constant application amount per unit area. The defined application amount may be preset and/or inputted in advance. In this case, the spray is preferably applied areally. This measure results in a further simplification of the method and/or overall system, since first of all, no regulation of the amount sprayed, and secondly, no identification of the plants and/or plant positions, as well, are necessary. The application may take place continuously, and/or using a specific application pattern.

The agricultural spraying device may be, in particular, part of an agricultural field sprayer and/or of a crop protection device, or may take the form of an agricultural field sprayer and/or a crop protection device. The agricultural spraying device may include a plurality of spray nozzles and fluid tanks. The agricultural spraying device may include a mobile unit or be positioned on a mobile unit; the mobile unit being able to take the form of, in particular, a land vehicle and/or aircraft and/or trailer. The mobile unit may be, in particular, an agricultural processing machine, such as a towing vehicle, a tractor, a self-driving and/or autonomous field sprayer or a self-driving and/or autonomous robot. The spraying device may include the detection unit or be positioned on the same mobile unit as the detection unit. The method is advantageously executed in an automated manner, in order to allow rapid and reliable treatment of a field.

In accordance with an example embodiment of the present invention, the steps of identifying the at least one row of plants, defining the plant region and the weed region, and ascertaining the plant value, are carried out with the aid of a processing unit. The processing unit is configured and/or equipped to process images. Therefore, the processing unit includes suitable image processing software. The processing unit may include, for example, a signal processor, a microcontroller or the like. The processing unit is part of a control unit, which is configured to output a control signal in such a manner, that a spray is applied to the weed region of the specified evaluation portion as a function of the ascertained plant value and/or of a magnitude of the ascertained plant value, using spray nozzles of a spraying device. Except for the processing unit for processing signals or data, the control unit may further include at least one storage unit for storing signals or data, at least one interface to a sensor or to an actuator for reading in sensor signals from the sensor or for outputting data signals or control signals to the actuator, and/or at least one communications interface for reading in or outputting data. The communications interface may be configured to read in or output data wirelessly and/or by wire; a communications interface, which is able to read in or output the data transmitted by wire, being able to read in these data, e.g., electrically or optically, from a corresponding data transmission line, or to output them to a corresponding data transmission line.

Accordingly, in accordance with an example embodiment of the present invention, the method of the present invention may be implemented in the control unit and/or in a control device as, for example, software or hardware or as a mixture of software and hardware.

In accordance with example embodiments of the present invention, the method of the present invention and the spraying device of the present invention now allow the maximum traveling and/or operating speed to be increased in a highly simple manner during the treatment of a field and, in so doing, to take into account the conflict of aims described at the outset. This is rendered possible, in particular, in that the necessary identification of the rows of plants is indeed carried out in the (entire) monitored field section, but the determination of the plant value is carried out only in a (smaller) specified evaluation portion, that is, in a subsection of the monitored field section. Accordingly, the image processing is divided up into two parallel processing paths having different image sizes. Due to the lower number of pixels in the image for determining the plant value, the necessary processing time therefore decreases. Secondly, by appropriately positioning the evaluation portion in the field section (away from the camera), the reaction path relevant to the application capability may be increased. The two factors, lower processing time and increased reaction path, increase the maximum possible traveling and/or operating speed.

Furthermore, in this connection, it is advantageous that no classification of the plants and/or plant objects is necessary. Instead, the present invention makes use of the fact that the cultivated plants are grown in plant rows and the weeds and grasses are distributed nonuniformly on the field. Therefore, the present invention defines a plant region including the row of plants, as well as a weed region; by definition, all plants in the plant region being regarded as cultivated plants, and all plants in the weed region being regarded as plants to be treated, in particular, weeds. The predefined spray is then applied to the weed region on the basis of an ascertained plant value, without classification or selection of the plants, and also irrespective of the grouping of the plants.

It is advantageous for the position of the specified evaluation portion in the monitored field section to be selected in such a manner, that in the direction of travel of the spraying device, the specified evaluation portion has a greater reaction path x, in particular, a maximum reaction path x, with respect to a spray region, that is, to the edge of a spray region of the following spray nozzle, in comparison with the monitored field section, or is positioned essentially centrally in the monitored field section. In this case, a spray region is to be understood as the region of the field, which is treatable/reachable and/or treated/reached by the spray/spray jet from the spray nozzle. This means that in other words, the spray region is a spraying surface or spray coverage. The spray region is a function of, inter alia, the spray characteristic of the spray nozzles. Using the first alternative, reaction path x and, therefore, the reaction time, may be maximized (at the expense of the image resolution). In the case of higher standards of accuracy, the highest image quality may be attained by the second alternative, since the lens aberrations are smallest in the center of the image, in which case reaction path x is increased, as well.

It is also advantageous for the position of the specified evaluation portion in the monitored field section to be selected as a function of a traveling speed of the spraying device, in particular, selected in such a manner, that a maximum image resolution in the specified evaluation portion results at a given traveling speed of the spraying device. Due to this measure, the maximum and/or most effective image resolution possible is selected in an automated manner as a function of the traveling speed, which means that the accuracy of the method, in particular, of ascertaining the plant value, may be increased.

In addition, it is advantageous for the step of identifying the at least one row of plants to be repeated (immediately) after a defined route section is covered, and/or (immediately) after defined time intervals, and/or (immediately) after irregular time intervals, and/or (immediately) after an executed change of direction of the agricultural spraying device in a defined angular range, and/or if computing time is available, in order to identify the current position of the rows of plants again. The change of direction may be, in particular, turning and/or a turning event, which means that the step of identifying the at least one row of plants is repeated immediately after the execution and/or completion of the change in direction and/or the turning event. The change of direction may be detected, in particular, with the aid of an acceleration sensor. In this connection, during these time intervals, that is, between the steps of defining the at least one row of plants for the step and/or steps of defining the at least one plant region, it is particularly advantageous for the position of the at least one row of plants in the direction of travel of the spraying device to be extrapolated or assumed to be constant. That is, in other words, the step of identifying the at least one row of plants is not carried out continually, that is, not for each step of the defining of the plant region and the weed region, and of the ascertaining of the plant value. Therefore, on one hand, the step of identifying the at least one row of plants and, on the other hand, the steps of defining the plant region and the weed region and ascertaining the plant value, are each carried out in parallel, asynchronous "processing paths." This action is possible, since the analyzed variables change on two different time scales: While the plant value, e.g., the degree of coverage, is an extremely local variable, for which strict requirements regarding its latency are set ("decision to spray"), the position of the rows of plants is approximately constant. Changes in the position of the rows of plants are produced only from the driving motion and/or camera motion, inaccuracies in the sowing, as well as the ground profile. These changes take place on comparatively long time scales and are also of a gradual nature. Thus, the positions of the rows of plants in the direction of travel may be extrapolated or assumed to be constant, and may be used as an input for the determination of the plant value in the parallel "processing path." This allows time, that is, computing time, for the image records and image processing, as well as internal communication time, to be reduced, which means that the total reaction time may be shortened or reduced further.

It is also advantageous for the plant region to have a variable width; the width being a function of a growth stage of a plant of the plant region situated in the corresponding region. Such a specific embodiment of the approach provided here offers the additional advantage, that the different increase in width of the cultivated plants in the plant region is considered, as well. In particular, this prevents parts of the cultivated plant, which extend into the weed region, from being rated as weeds. For that purpose, an envelope about the actual center of the plant row is defined in light of the stage of growth of the cultivated plant. Plant parts/pixels, which border directly on a plant pixel from the cultivated plant region (neighborhood pixels), are then rated as a cultivated plant, as well.

Exemplary embodiments of the present invention are represented in the figures and explained in greater detail below.

BRIEF DESCRIPTION OF THE DRAWINGS

FIG. 3 shows a schematic representation of a monitored field section having a specified evaluation portion, according to an example embodiment of the present invention.

FIG. 4 shows a flow chart of a method according to an exemplary embodiment of the present invention.

DETAILED DESCRIPTION OF EXAMPLE EMBODIMENTS

Figure 1:
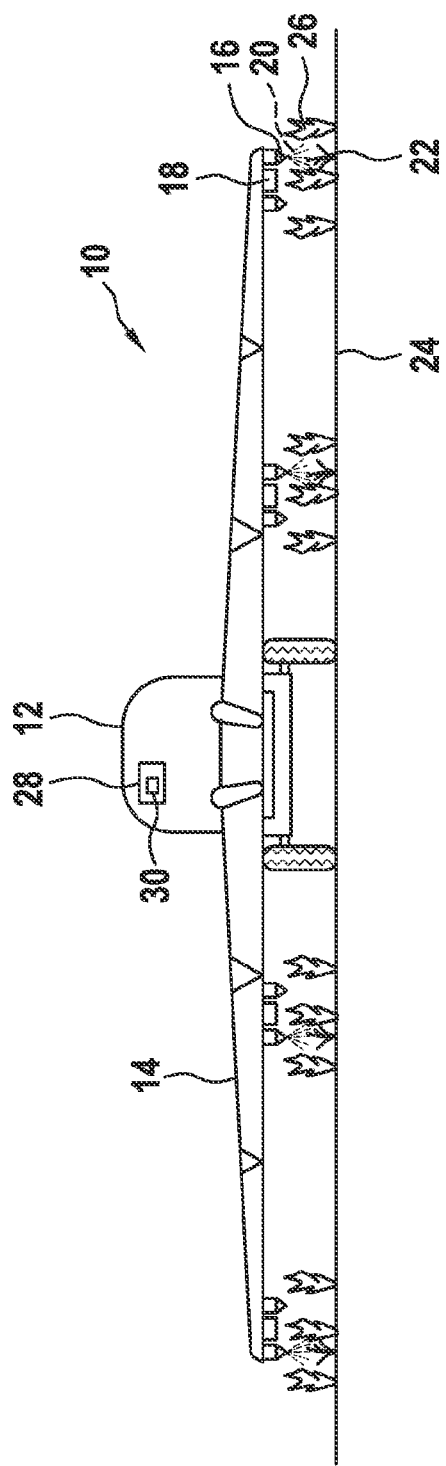
FIG. 1 shows a schematic representation of an agricultural spraying device according to an example embodiment of the present invention.

In the description below of preferred exemplary embodiments of the present invention, the same or similar reference numerals are used for the elements that are shown in the different figures and function similarly, in which case a repeated description of these elements is omitted.

A schematic representation of an agricultural spraying device, the entirety of which is denoted by reference numeral 10, is shown in FIG. 1.

Agricultural spraying device 10 takes the form of a field sprayer 10. Field sprayer 10 is positioned on a mobile land vehicle 12, which takes the form of a towing vehicle 12 or tractor 12.

Agricultural spraying device 10 includes a spray boom 14. Spray nozzles 16 and optical detection units 18 are situated on spray boom 14. Spray nozzles 14 are designed to apply a spray 20 to weeds 22 of an agricultural plot. Optical detection units 18 take the form of optical cameras 18. Optical cameras 18 each include a filtering unit for extracting a color portion, such as the green color portion of an acquired image, in order to detect weeds 22 and plants 26. As described below in further detail in light of FIG. 2, cameras 18 are positioned in front of spray nozzles 16 in the direction of travel of spraying device 10.

Agricultural spraying device 10 further includes a delivery unit, which is not shown, and with the aid of which the application quantity and/or a quantity of active agent in the spray 20 to be applied is adjustable or variable.

Agricultural spraying device 10 also includes a control unit 28, which is connected to optical cameras 18, in order to receive data from them. Control unit 28 includes a processing unit 30, which is configured to execute computational steps and/or image processing steps for carrying out the method of the present invention. Control unit 28 is further configured to output a control signal in such a manner, that spray 20 is applied via spray nozzles 16 as a function of the ascertained plant value.

Figure 2:
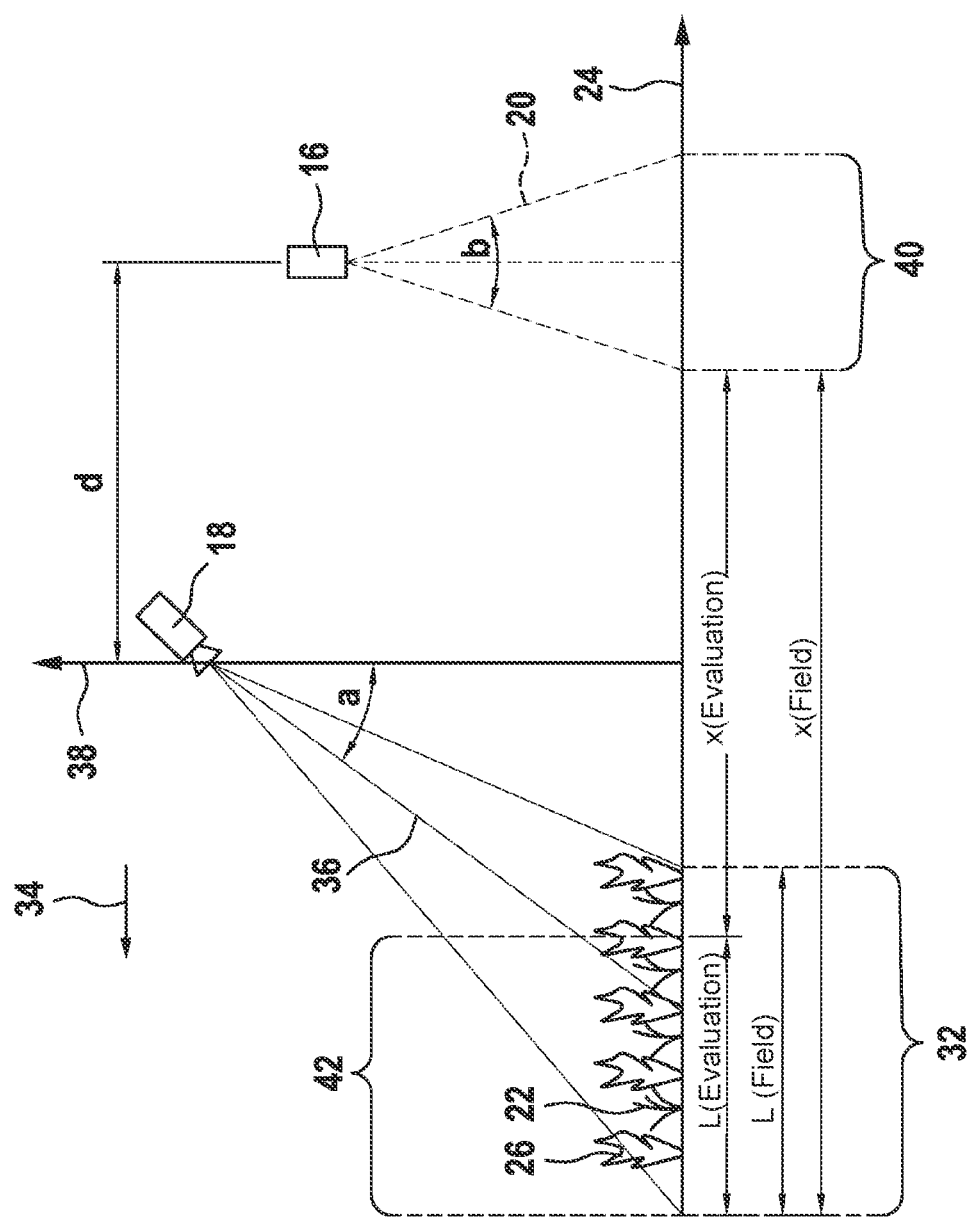
FIG. 2 shows a schematic representation of a basic geometric layout of the detection unit and spray nozzle relative to each other, according to an example embodiment of the present invention.

FIG. 2 shows a basic geometric layout of a spray nozzle 16 and a detection unit 18 or camera 18 on agricultural spraying device 10. As explained at the outset, a length L(Field), as long as possible, of a field section 32 monitored with the aid of camera 18, is desired and/or advantageous for identifying rows of plants, since in this manner, the number of plants 26 in monitored field section 32, that is, monitored image portion, increases, and consequently, the identification of the rows of plants is made easier. At the same time, when the number of image pixels is limited, the image resolution in the monitored image portion decreases, and consequently, the ability to detect small plant objects also decreases. In addition, a reaction path x(Field) decreases at a constant angle of inclination a. In this case, angle of inclination a is the angle between an optical axis 36 of camera 18 and a vertical line 38 in direction of travel 34 of spraying device 10.

Together with the traveling speed of spraying device 10, reaction path x, that is, the geometric distance x between monitored field section 32 and a spray region 40 of following spray nozzle 16, yields the maximum reaction time t(max) of the system, that is, of spraying device 10. If more time than t(max) is necessary for image recording, image processing, internal communication times, nozzle and/or valve control, and flight time of the spray, the system, that is, spraying device 10, is not able to carry out locationally correct application. Accordingly, reaction path x and reaction time t(max) predetermine the maximum traveling and/or operating speed of the system, that is, of spraying device 10. Important parameters for increasing x include, above all, a geometric distance d between camera 18 and spray nozzle 16, angle of inclination a of camera 18, and length L(Field) of monitored field section 32, that is, of the acquired image portion at the base of field 24.

In order to now increase the maximum traveling and/or operating speed, the present invention does not shorten length L(Field) of monitored field section 32, since, as explained above, it is supposed to be as large as possible for identifying rows of plants, but a new (smaller) evaluation portion 42 of monitored field section 32, having a length L(Evaluation), is specified and/or defined. Through this, the image processing is divided up into two parallel processing paths; the step of identifying rows of plants advantageously being carried out in the monitored field section 32 having the greater length L(Field), and the steps of defining plant regions and weed regions, and of ascertaining a plant value, being carried out in the specified evaluation portion 42 having the smaller length L(Evaluation).

Since length L(Evaluation) of specified evaluation portion 42 in direction of travel 34 of spraying device 10 is less than length L(Field) of monitored field section 32, first of all, the necessary processing time and, consequently, reaction time t(max), decrease due to the lower number of pixels in the image of specified evaluation portion 42. In addition, in the exemplary embodiment shown, the position of specified evaluation portion 42 in monitored field section 32 is selected in such a manner, that in direction of travel 34 of spraying device 10, specified evaluation portion 42 has a larger reaction path x(Evaluation) than monitored field section 32 x(Field) with respect to spray region 40 of following spray nozzle 16. This increases the reaction path x relevant to the application capability. The two factors, lower processing time and increased reaction path, increase the maximum possible traveling and/or operating speed.

In order to decrease the processing time further, the step of identifying rows of plants 44 is not performed constantly, but only repeated after a defined route section of spraying device 10 is covered. In this context, between the steps of identifying rows of plants 44, the position of rows of plants 44 in direction of travel 34 of spraying device 10 is extrapolated for the steps of defining plant regions 46.

As FIG. 3 illustrates, the at least one row of plants 44 is identified, e.g., from the measured portion of the color green, with the aid of processing unit 30, in a "processing path" in the (entire) monitored field section 32 and/or the (entire) acquired image of field section 32. On the other hand, in a parallel "processing path," with the aid of processing unit 30, a plant region 46 containing the at least one identified row of plants 44 is now defined in specified evaluation portion 42 of monitored field section 32, using identified row of plants 44 and a weed region 48 different from plant region 46. In this case, weed region 48 is defined as a region between the rows of plants 44 in specified evaluation portion 42. Weed region 48 is, by definition, a region that only includes weeds 22. In addition, in the parallel "processing path," a plant value of weed region 48 is ascertained in specified evaluation portion 42 of monitored field section 32.

The ascertained plant value is used for deciding if and/or how weed region 48 should be treated. In the example shown, the decision as to whether weed region 48 is treated, that is, as to whether spray is dispensed, is made as a function of the weed growth of weed region 48. Therefore, the plant value represents a degree of coverage of weed region 48 by plant material. If the plant value reaches and/or exceeds a predefined threshold value, then spray 20 is applied to weed region 48 with the aid of spraying device 10, in order to treat weed region 48, that is, the weeds 22 in weed region 48.

FIG. 4 shows a flow chart of an exemplary embodiment of the approach put forward here, in the form of a method 100 for applying a spray 20, in particular, a crop protection chemical 20, to a field 24. Method 100 includes a step of monitoring 102 a field section 32 of field 24 having plants 26, using an optical and/or infrared detection unit 18. Method 100 further includes a step of identifying 104 at least one row of plants 44 in monitored field section 32 with the aid of a processing unit 30. Method 100 further includes a step of defining 106, with the aid of processing unit 30, a plant region 46 including the at least one identified row of plants 44, using the at least one identified row of plants 44 and a weed region 48 different from the plant region 46, in a specified evaluation portion 42 of monitored field section 32. Method 100 also includes a step of ascertaining 108 a plant value of weed region 48 in specified evaluation portion 42 of monitored field section 32 with the aid of processing unit 30. Finally, method 10 includes a step of applying 110 spray 20 to weed region 48 of specified evaluation portion 42 as a function of the ascertained plant value, using spray nozzles 16 of spraying device 10.

The step of identifying 104 the at least one row of plants 44 may advantageously be repeated only after a defined route section is covered, or in irregular time intervals, or if computing time is available, in order to identify the position of rows of plants 44 again. In this connection, in an extrapolating step 102', the position of the at least one row of plants 44 in direction of travel 34 of spraying device 10 may be extrapolated between the steps of identifying 104 the at least one row of plants 44 for the steps of defining 106 the at least one plant region 46.

If an exemplary embodiment includes an "and/or" conjunction between a first feature and a second feature, then this is to be read such that, according to one specific embodiment, the exemplary embodiment includes both the first feature and the second feature, and according to another specific embodiment, the exemplary embodiment includes either only the first feature or only the second feature.

What is claimed is:

1. A method for applying a spray to a field using an agricultural spraying device that travels in a direction, the method comprising the following steps:
monitoring a field section of the field having plants, using an optical and/or infrared detection unit;
identifying at least one row of plants in the monitored field section using a processing unit;
defining, using the processing unit, a plant region containing the at least one identified row of plants in a specified evaluation portion of the monitored field section, using the at least one identified row of plants and an identified weed region different from the plant region;
ascertaining a plant value of the weed region in the specified evaluation portion of the monitored field section using the processing unit; and
applying the spray to the weed region of the specified evaluation portion as a function of the ascertained plant value, using spray nozzles of the agricultural spraying device;
wherein, in a direction of travel of the spraying device, a length of the specified evaluation portion is less than a length of the monitored field section; and
wherein a position of the specified evaluation portion in the monitored field section is selected in such a manner that, in the direction of travel of the spraying device, the distance between the specified evaluation portion and the spray region of a following spray nozzle of the spray nozzles is greater than the distance between the monitored field section and the spray region of the following spray nozzle.

2. The method as recited in claim 1, wherein the spray is a crop protection chemical.

3. The method as recited in claim 1, wherein the step of identifying the at least one row of plants is performed, using and/or evaluating the entire monitored field section.

4. The method as recited in claim 1, wherein the step of identifying the at least one row of plants is repeated: (i) after a defined route section is covered, or (ii) after defined time intervals, or (iii) after irregular time intervals, or (iv) after an executed change of direction of the agricultural spraying device in a defined angular range, or (v) when computing time is available, in order to identify a current position of the rows of plants again.

5. The method as recited in claim 4, wherein between the repeated steps of identifying the at least one row of plants, the position of the at least one row of plants in a direction of travel of the spraying device is extrapolated or assumed to be constant.

6. The method as recited in claim 1, wherein the plant value represents a degree of coverage of the weed region by plant material and/or an amount of plant material in the weed region and/or a number of weeds in the weed region.

7. The method as recited in claim 1, wherein the step of applying includes comparing the ascertained plant value to a threshold value, and wherein the step of applying is executed in response to the threshold value being reached, or fallen below, or exceeded.

8. The method as recited in claim 1, wherein the plant region has a variable width, and the width is a function of a stage of growth of a plant of the plant region, situated in the plant region.

9. A control unit, comprising
a processing unit;
wherein the control unit is configured to:
identify at least one row of plants in a field section of a field having plants, the field section being monitored using an optical and/or infrared detection unit;
define a plant region containing the at least one identified row of plants in a specified evaluation portion of the monitored field section, using the at least one identified row of plants and an identified weed region different from the plant region;
ascertain a plant value of the weed region in the specified evaluation portion of the monitored field section; and
output a control signal in such a manner that a spray is applied to the weed region of the specified evaluation portion as a function of the ascertained plant value using spray nozzles of an agricultural spraying device that travels in a direction;
wherein, in a direction of travel of the spraying device, a length of the specified evaluation portion is less than a length of the monitored field section; and
wherein a position of the specified evaluation portion in the monitored field section is selected in such a manner that, in the direction of travel of the spraying device, the distance between the specified evaluation portion and the spray region of a following spray nozzle of the spray nozzles is greater than the distance between the monitored field section and the spray region of the following spray nozzle.

10. An agricultural spraying device that travels in a direction, comprising:
an optical and/or infrared detection unit configured to monitor a field section of a field having plants, an optical axis of the optical and/or infrared detection unit having an angle of inclination greater than 0° relative to a vertical line in a direction of travel of the spraying device;
a control unit including:
a processing unit,
wherein the control unit is configured to:
identify at least one row of plants in the field section being monitored using the optical and/or infrared detection unit;
define a plant region containing the at least one identified row of plants in a specified evaluation portion of the monitored field section using the at least one identified row of plants and an identified weed region different from the plant region;
ascertain a plant value of the weed region in the specified evaluation portion of the monitored field section; and
output a control signal in such a manner that a spray is applied to the weed region of the specified evaluation portion as a function of the ascertained plant value, using spray nozzles of the agricultural spraying device; and
the spray nozzles, the spray nozzles being configured to apply the spray to the weed region of the specified evaluation portion as a function of the ascertained plant value;
wherein, in a direction of travel of the spraying device, a length of the specified evaluation portion is less than a length of the monitored field section; and
wherein a position of the specified evaluation portion in the monitored field section is selected in such a manner that, in the direction of travel of the spraying device, the distance between the specified evaluation portion and the spray region of a following spray nozzle of the spray nozzles is greater than the distance between the monitored field section and the spray region of the following spray nozzle.

11. A non-transitory machine-readable storage medium on which is stored a computer program for applying a spray to a field using an agricultural spraying device that travels in a direction, the computer program, when executed by a computer, causing the computer to perform the following steps:

monitoring a field section of the field having plants, using an optical and/or infrared detection unit;

identifying at least one row of plants in the monitored field section using a processing unit;

defining, using the processing unit, a plant region containing the at least one identified row of plants in a specified evaluation portion of the monitored field section using the at least one identified row of plants and an identified weed region different from the plant region;

ascertaining a plant value of the weed region in the specified evaluation portion of the monitored field section using the processing unit; and applying the spray to the weed region of the specified evaluation portion as a function of the ascertained plant value, using spray nozzles of the agricultural spraying device;

wherein, in a direction of travel of the spraying device, a length of the specified evaluation portion is less than a length of the monitored field section; and wherein a position of the specified evaluation portion in the monitored field section is selected in such a manner that, in the direction of travel of the spraying device, the distance between the specified evaluation portion and the spray region of a following spray nozzle of the spray nozzles is greater than the distance between the monitored field section and the spray region of the following spray nozzle.

* * * * *